(12) United States Patent
Liow et al.

(10) Patent No.: US 10,598,878 B2
(45) Date of Patent: Mar. 24, 2020

(54) SCAVENGING PHOTODETECTION DEVICE

(71) Applicant: Rain Tree Photonics Pte. Ltd., Singapore (SG)

(72) Inventors: Tsung-Yang Liow, Singapore (SG); Ying Huang, Singapore (SG)

(73) Assignee: Rain Tree Photonics Pte. Ltd., Singapore (SG)

( * ) Notice: Subject to any disclaimer, the term of this patent is extended or adjusted under 35 U.S.C. 154(b) by 0 days.

(21) Appl. No.: 16/245,763

(22) Filed: Jan. 11, 2019

(65) Prior Publication Data

US 2019/0219782 A1  Jul. 18, 2019

Related U.S. Application Data

(60) Provisional application No. 62/616,442, filed on Jan. 12, 2018.

(51) Int. Cl.
*G02B 6/42* (2006.01)
*G02B 6/43* (2006.01)
*G02B 6/12* (2006.01)
*G02B 6/122* (2006.01)

(52) U.S. Cl.
CPC ........... *G02B 6/43* (2013.01); *G02B 6/12004* (2013.01); *G02B 6/1228* (2013.01); *G02B 6/4221* (2013.01); *G02B 2006/1213* (2013.01)

(58) Field of Classification Search
None
See application file for complete search history.

(56) References Cited

U.S. PATENT DOCUMENTS

| | | | |
|---|---|---|---|
| 6,298,178 B1 * | 10/2001 | Day | G02B 6/12004 385/14 |
| 7,352,924 B2 * | 4/2008 | Gaebe | G02B 6/421 385/14 |
| 2017/0146742 A1 * | 5/2017 | Ishikawa | G02B 6/12019 |

* cited by examiner

*Primary Examiner* — Chad H Smith
(74) *Attorney, Agent, or Firm* — Dinsmore & Shohl, LLP

(57) ABSTRACT

A scavenging photodetection device (10) is provided. The scavenging photodetection device (10) includes an optical coupling portion (12) and a scavenging photodetection portion (14). The optical coupling portion (12) includes an optical coupler (16) configured to receive light from a light source, a plurality of light absorbers (18) arranged to absorb the light from the light source that is not collected by the optical coupler (16), and at least one primary input waveguide (20) optically coupled to the optical coupler (16) and configured to direct collected light to a photonic integrated circuit. The scavenging photodetection portion (14) includes a primary photodetector (22) configured to collect uncollected light from the optical coupling portion (12) to determine an alignment position of the photonic integrated circuit.

12 Claims, 5 Drawing Sheets

SCAVENGING PHOTODETECTION DEVICE

CROSS REFERENCE TO RELATED APPLICATION

This application claims the benefit of priority under 35 U.S.C. § 119(e) to U.S. Provisional Application Ser. No. 62/616,442, filed Jan. 12, 2018, incorporated by reference herein in its entirety.

FIELD

The present invention relates to the field of photonics and more particularly to a scavenging photodetection device.

BACKGROUND

Due to small mode sizes in photonic waveguides, specially designed optical couplers are required to couple light to and from an integrated photonics chip. Owing to tight alignment tolerance, active alignment is typically utilized during packaging and assembly of lasers and fibres with integrated photonics chips. As part of the active alignment process, an optical power monitor is typically used for determining optimal alignment position. In silicon photonics, a typical method of implementing an optical power monitor on chip is by using a power splitting device such as a directional coupler to tap a small percentage of coupled light from an input waveguide. This small percentage of light that is tapped is then sent to an on-chip monitor photodetector. Disadvantageously, the directional coupler tapping percentage is wavelength dependent and sensitive to fabrication variations. Directional couplers are also polarization sensitive. Furthermore, the small percentage of light that is tapped from the input waveguide also results in optical loss. It is therefore desirable to provide a scavenging photodetection device that mitigates these drawbacks.

SUMMARY

Accordingly, in a first aspect, the present invention provides a scavenging photodetection device. The scavenging photodetection device includes an optical coupling portion and a scavenging photodetection portion. The optical coupling portion includes an optical coupler configured to receive light from a light source, a plurality of light absorbers arranged to absorb the light from the light source that is not collected by the optical coupler, and at least one primary input waveguide optically coupled to the optical coupler and configured to direct collected light to a photonic integrated circuit. The scavenging photodetection portion includes a primary photodetector configured to collect uncollected light from the optical coupling portion to determine an alignment position of the photonic integrated circuit.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

Figure 1:
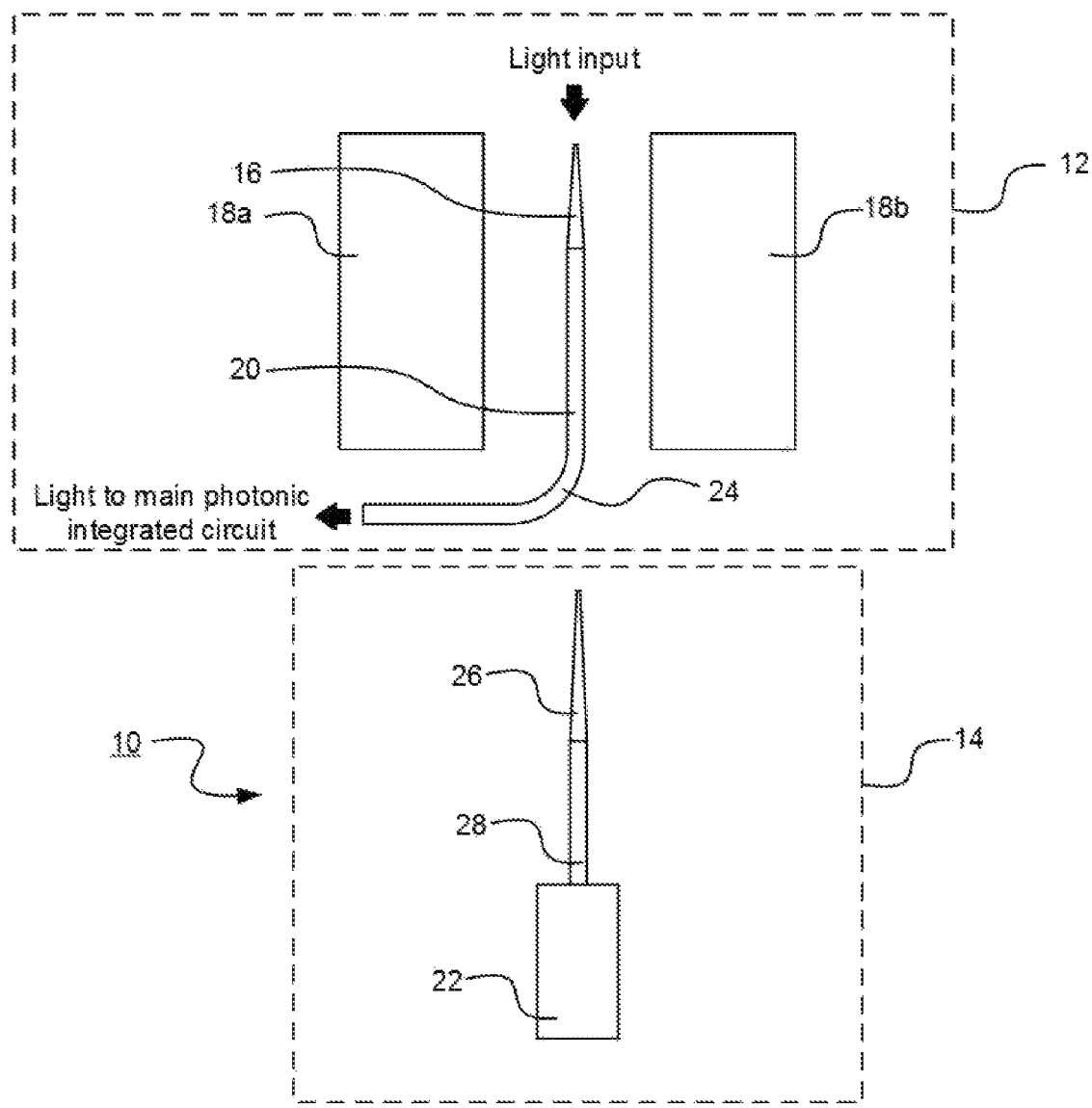
FIG. 1 is schematic top plan view of a scavenging photodetection device in accordance with an embodiment of the present invention.

Referring now to FIG. 1, a scavenging photodetection device or optical coupling apparatus 10 is shown. The scavenging photodetection device 10 includes an optical coupling portion 12 and a scavenging photodetection portion 14. The optical coupling portion 12 includes an optical coupler 16 configured to receive light from a light source (not shown), a plurality of light absorbers 18 arranged to absorb the light from the light source that is not collected by the optical coupler 16, and at least one primary input waveguide 20 optically coupled to the optical coupler 16 and configured to direct collected light to a photonic integrated circuit (not shown). The scavenging photodetection portion 14 includes a primary photodetector 22 configured to collect uncollected light from the optical coupling portion 12 to determine an alignment position of the photonic integrated circuit.

The two circuit blocks shown in FIG. 1—a light coupling circuit block 12 and a scavenging photodetector circuit block 14—work in conjunction with each other as will be described in greater detail below.

In the embodiment shown, the optical coupler 16 includes at least one primary taper coupler. The primary taper coupler 16 may be a silicon nano-taper. In the present embodiment, light input is directly collected by the primary taper coupler 16 as the primary taper coupler 16 is placed closer to the edge of the photonic integrated chip (not shown) to collect light at the input.

The light absorbers 18 in the present embodiment include a first light absorbing region 18a on a first side of the at least one primary input waveguide 20 and a second light absorbing region 18b on a second side of the at least one primary input waveguide 20. The light absorbing regions 18a and 18b may be composed of germanium, highly doped silicon or metals. In the present embodiment, the light absorbing regions 18a and 18b are placed on both sides of the primary taper coupler 16 to absorb stray light that was not successfully coupled into the primary taper coupler 16. Importantly, uncollected light at either side of the primary taper coupler 16 needs to be absorbed so that it does not get collected by the scavenging photodetector circuit block 14. Otherwise, this would lead to false readings during the alignment and assembly of the light source.

The light is subsequently coupled into the at least one primary input waveguide 20. The at least one primary input waveguide 20 may be a single-mode waveguide and may be made of silicon. In the embodiment shown, the optical coupling portion 12 includes a bend 24 in the at least one primary input waveguide 20 to direct the collected light away from the scavenging photodetection portion 14. The at least one primary input waveguide 20, which is bent at an angle, bends and guides the light to the main photonic integrated circuit.

Because the primary taper coupler 16 is typically unable to collect all the light, the uncollected light continues to propagate further into the photonic integrated chip where the scavenging photodetector 22 is placed to collect and absorb the uncollected light. The primary photodetector 22 thus serves as an input power monitoring photodetector. In the embodiment shown, the scavenging photodetection portion 14 includes at least one secondary taper coupler 26 configured to collect the uncollected light from the optical coupling portion 12 and at least one secondary input waveguide 28 optically coupled between the at least one secondary taper coupler 26 and the primary photodetector 22. The secondary taper coupler 26 may be a silicon nano-taper and the at least one secondary input waveguide 28 may be a silicon waveguide. In the present embodiment, the secondary taper coupler 26 is used to directly collect the light before coupling into the primary photodetector 22 via the at least one secondary input waveguide 28. The secondary taper coupler 26 may collect the light directly from the cladding (not shown) of the photonic integrated chip. This configuration has the advantage of being more precise in discriminating the light from the optical coupling portion 12 from the stray light.

The scavenging photodetection device 10 allows for monitoring of input power during alignment and assembly of a light source which may be a laser diode or an optical fibre. During operation, laser power may also be monitored and fed back to a laser driver circuit (not shown). This feature is achieved without the use of power splitters or power taps and utilizes light which would otherwise be wasted. Furthermore, unlike directional couplers, wavelength dependence of the scavenging photodetection device 10 is low and fabrication tolerance is high. The scavenging photodetection device 10 further prevents uncollected light from causing optical crosstalk in photonic integrated circuits on a chip.

As will be appreciated by those of ordinary skill in the art, the present invention is not limited to the optical coupling portion 12 and the scavenging photodetection portion 14 shown in FIG. 1. Alternative embodiments of the optical coupling portion 12 of the scavenging photodetection device 10 will now be described below with reference to FIGS. 2A through 2E, while alternative embodiments of the scavenging photodetection portion 14 of the scavenging photodetection device 10 will also be described below with reference to FIGS. 3A through 3C.

Figure 2A:
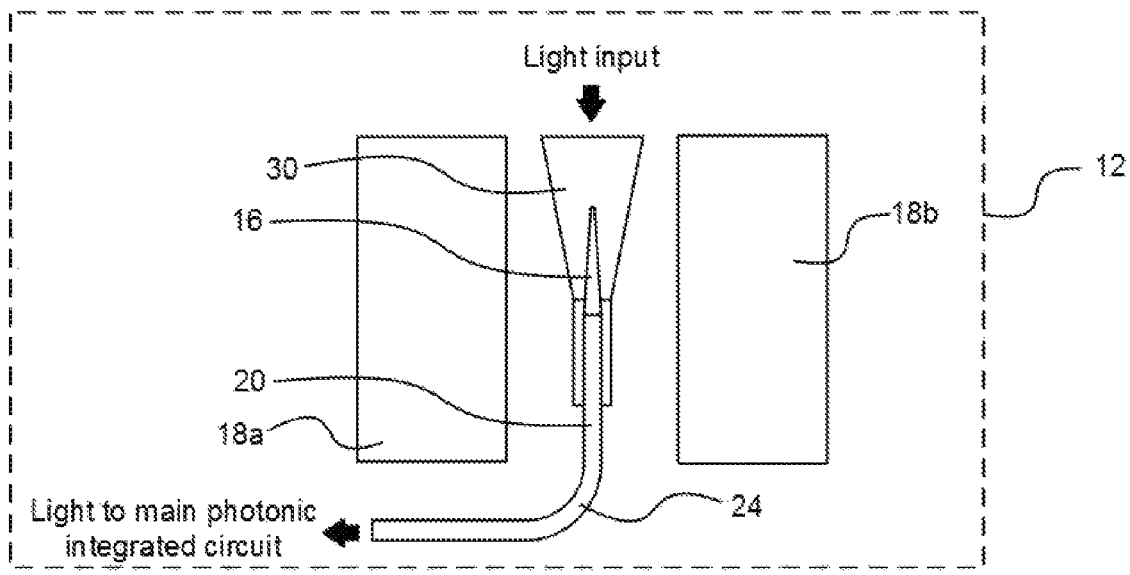
FIGS. 2A through 2E are schematic top plan views of alternative embodiments of an optical coupling portion of a scavenging photodetection device in accordance with various embodiments of the present invention.

Referring now to FIG. 2A, an alternative embodiment of the optical coupling portion 12 of the scavenging photodetection device 10 is shown. The present embodiment differs from the previous embodiment in that the optical coupler includes a primary light collecting waveguide 30 optically coupled to the at least one primary taper coupler 16. The primary light collecting waveguide 30 have a large mode size and may be a low index-contrast waveguide with a refractive index contrast of between about 0.01 and about 0.60. The primary light collecting waveguide 30 may be composed of silicon dioxide. In such an embodiment, input light enters the photonic chip and is coupled into the chip via the primary light collecting waveguide 30 positioned near the edge of the chip.

The light absorbing regions 18a and 18b are placed on both sides of the primary light collecting waveguide 30 to absorb stray light that is not successfully coupled into the primary light collecting waveguide 30. Such stray light typically occurs due to misalignment of the input light source to the primary light collecting waveguide 30.

At a suitable point in the primary light collecting waveguide 30, the at least one primary taper coupler 16 is placed to collect the light. The mode is compressed before being collected by the at least one primary taper coupler 16, following which the mode then expands to the width of the at least one primary input waveguide 20.

Figure 2B:
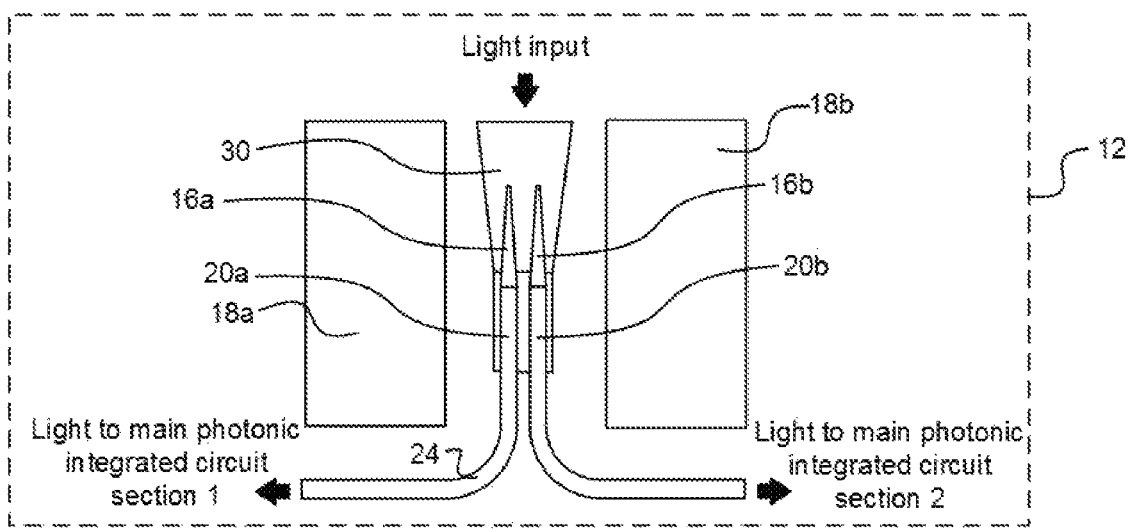

Referring now to FIG. 2B, another embodiment of the optical coupling portion 12 of the scavenging photodetection device 10 is shown. The present embodiment differs from the earlier embodiments in that the at least one primary taper coupler includes a first primary taper coupler 16a and a second primary taper coupler 16b at a predetermined spacing from one another, a power splitting ratio being defined between the first and second primary taper couplers 16a and 16b.

In the embodiment shown, the two (2) primary taper couplers 16a and 16b are placed within the primary light collecting waveguide 30 to achieve power splitting of the input light to two different photonic integrated circuit sections. More particularly, a further function of optical splitting is achieved by placing a second primary taper coupler 16b within the primary light collecting waveguide 30 to collect the light. By changing the relative positions of the first and second primary taper couplers 16a and 16b, the power splitting ratios may be adjusted. The amount of uncollected light that subsequently passes on to the scavenging photodetector circuit 14 may also adjusted by adjusting the gap between the first and second primary taper couplers 16a and 16b. This may be necessary if the primary photodetector 22 is not sensitive enough or if the input light power is too low. As the mode profile in the low index-contrast waveguide 30 is symmetrical, equal power splitting or power splitting by a pre-determined splitting ratio may be achieved. Another advantage is that additional optical loss that would have been incurred by using an additional power splitting device such as a Y-branch or multi-mode interferometer (MMI) power splitter or directional coupler can also be avoided. It should be noted that such an embodiment is different from simply using two silicon nano-tapers to collect the input light as in such a case, misalignment of the input light causes the power splitting to be unequal. This is undesirable as this is not by design and would be subjected to the alignment of the input light.

Figure 2C:
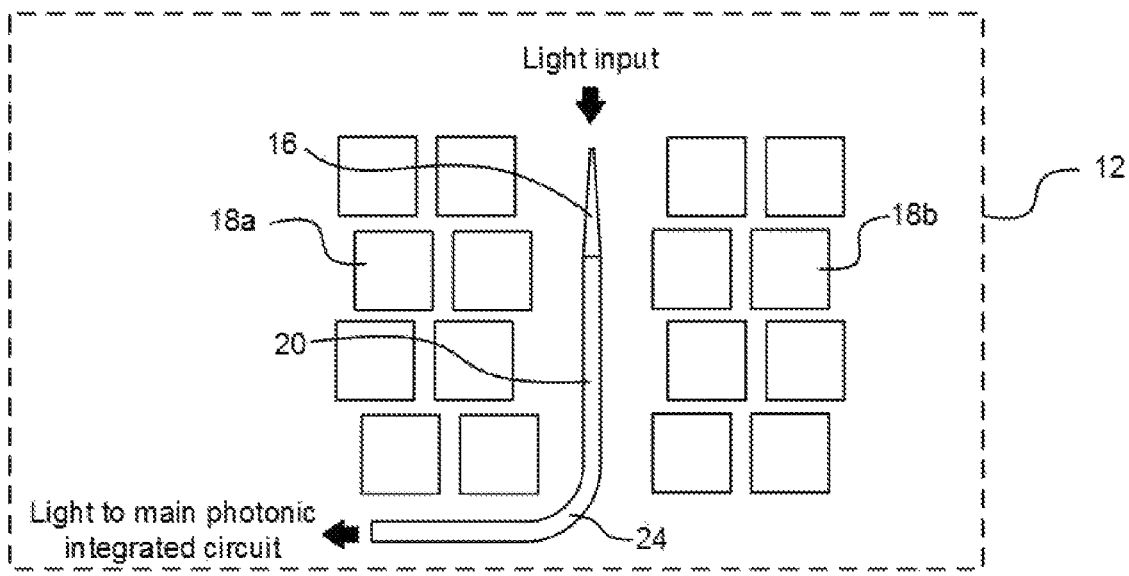

Referring now to FIG. 2C, yet another embodiment of the optical coupling portion 12 of the scavenging photodetection device 10 is shown. The present embodiment differs from the earlier embodiments in that the first and second light absorbing regions 18a and 18b includes a plurality of light absorbing tiles, instead of a contiguous region. As will be appreciated by persons of ordinary skill in the art, different shapes and designs may be used for the light absorbers 18 to improve the efficiency of light absorption or to comply with fabrication design rules.

Figure 2D:
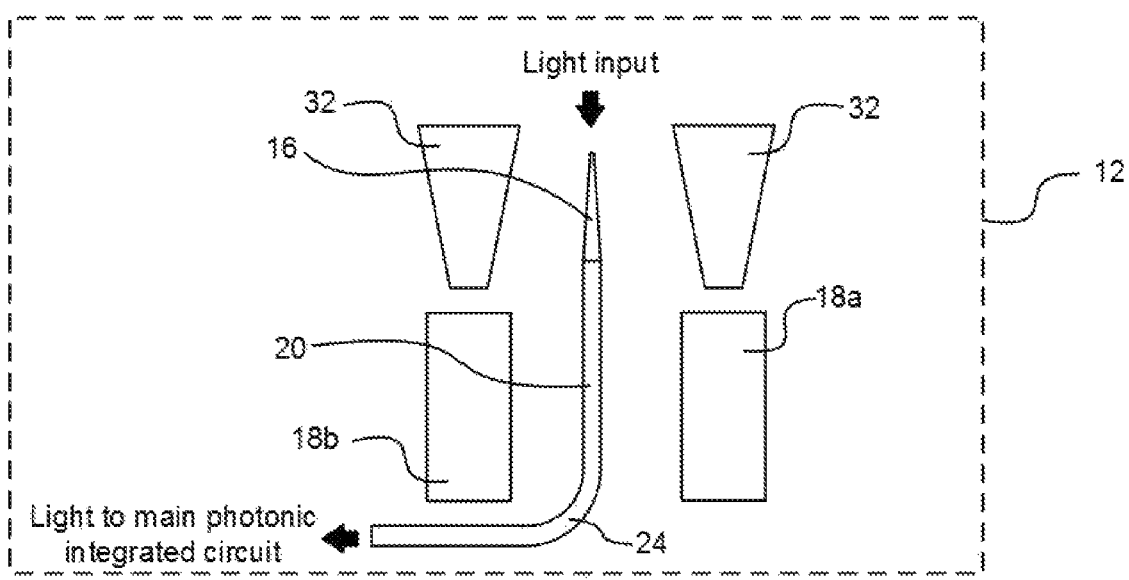

Referring now to FIG. 2D, still another embodiment of the optical coupling portion 12 of the scavenging photodetection device 10 is shown. The present embodiment differs from the earlier embodiments in that the optical coupler 16 is flanked by a plurality of tertiary light collecting waveguides 32. The tertiary light collecting waveguides 32 may be low index-contrast waveguides with a refractive index contrast of between about 0.01 and about 0.60 and may be made of silicon dioxide. The tertiary light collecting waveguides 32 are configured to collect the light from the light source that is not collected by the optical coupler 16 and to couple the collected light into the light absorbers 18. Accordingly, the light guiding structures 32 are placed on either side of the light input to guide and couple the light into the light absorption regions 18a and 18b.

Figure 2E:
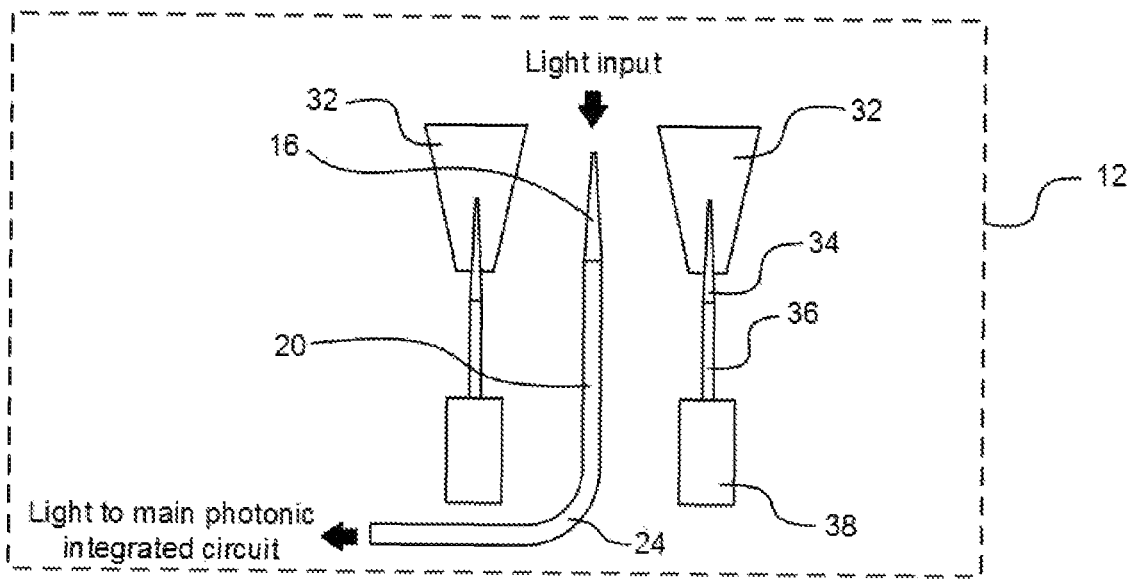

Referring now to FIG. 2E, a further embodiment of the optical coupling portion 12 of the scavenging photodetection device 10 is shown. The present embodiment differs from the earlier embodiments in that at least one of the light absorbers includes a tertiary taper coupler 34 optically coupled to a corresponding one of the tertiary light collecting waveguides 32, a tertiary input waveguide 36 optically coupled to the tertiary taper coupler 34 and a secondary photodetector 38 optically coupled to the tertiary input waveguide 36. The tertiary taper coupler 34 may be a silicon nano-taper and the tertiary input waveguide 36 may be a silicon waveguide. In the embodiment shown, the light guiding structure 32 is provided on each side to guide the light before collection by the tertiary taper coupler 34 into the secondary photodetector 38 via the tertiary input waveguide 36. In this manner, the tertiary taper coupler 34 and the tertiary input waveguide 36 are used to couple and guide the light into the secondary photodetector 38. In such an embodiment, the reading from the secondary photodetector 38 may be used in combination with the reading from the primary photodetector 22 during optical alignment and assembly.

Figure 3A:
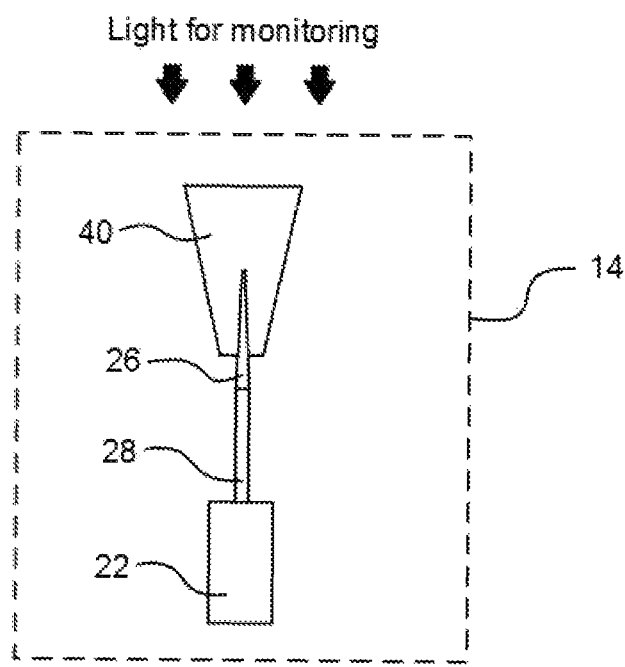
FIGS. 3A through 3C are schematic top plan views of alternative embodiments of a scavenging photodetection portion of a scavenging photodetection device in accordance with various embodiments of the present invention.

Referring now to FIG. 3A, an alternative embodiment of the scavenging photodetection portion 14 of the scavenging photodetection device 10 is shown. The present embodiment differs from the previous embodiment in that the scavenging photodetection portion 14 further includes a secondary light collecting waveguide 40 optically coupled to the at least one secondary taper coupler 26. The secondary light collecting waveguide 40 may be a low index-contrast waveguide with a refractive index contrast of between about 0.01 and about 0.6 and may be made of silicon dioxide material or silicon nitride material. The secondary light collecting waveguide 40 may be placed after the waveguide bend 24 to collect the remaining light that was travelling within the optical coupling portion 12 that was not collected by the primary taper coupler 16. The light in the secondary light collecting waveguide 40 is then collected by the at least one secondary taper coupler 26, which is subsequently coupled into the at least one secondary input waveguide 28 before being guided into the primary photodetector 22 for absorption.

Figure 3B:
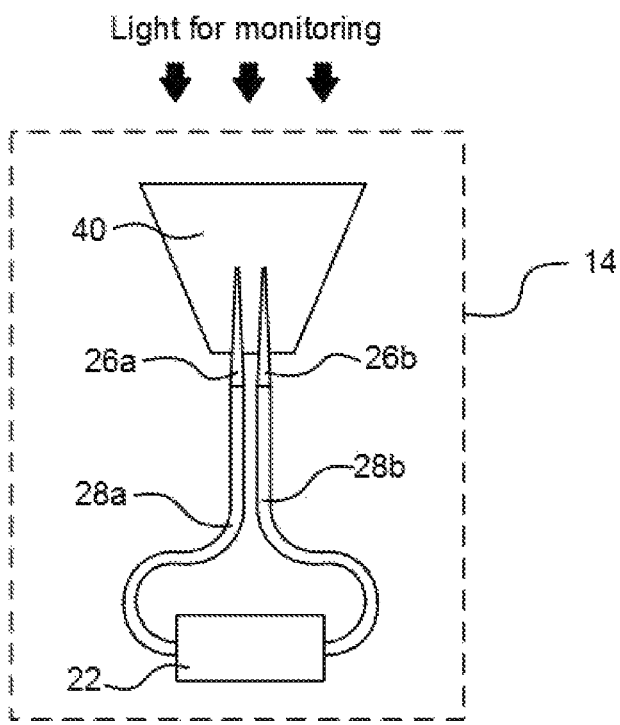

Referring now to FIG. 3B, yet another embodiment of the scavenging photodetection portion 14 of the scavenging photodetection device 10 is shown. The present embodiment differs from the earlier embodiments in that two (2) secondary taper couplers 26a and 26b collect the light from within a wider secondary light collecting waveguide 40 before coupling into opposite ends of the primary photodetector 22 via two (2) secondary input waveguides 28a and 28b. In such an embodiment, the second secondary taper coupler 26a is placed within the wider secondary light collecting waveguide 40 to achieve more efficient light collection.

Figure 3C:
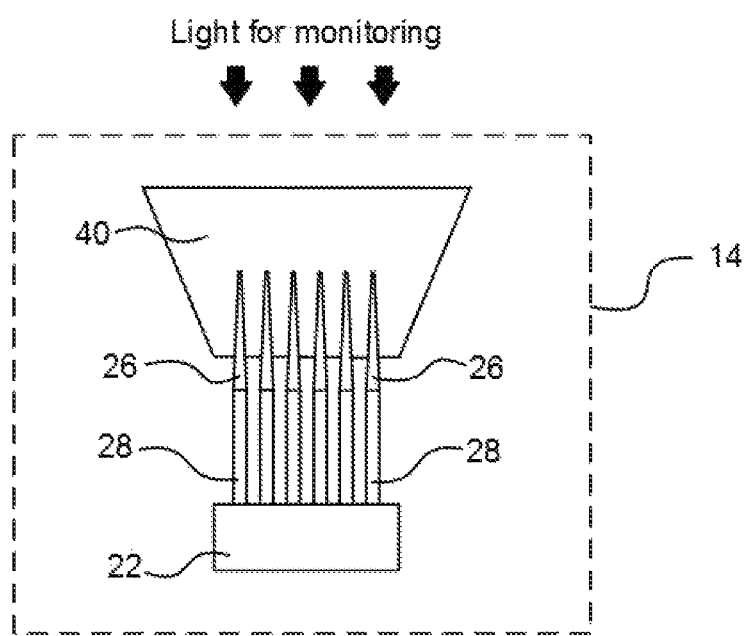

Referring now to FIG. 3C, another embodiment of the scavenging photodetection portion 14 of the scavenging photodetection device 10 is shown. The present embodiment differs from the earlier embodiments in that a plurality of secondary taper couplers 26 collect the light from within an even wider secondary light collecting waveguide 40 before coupling into the primary photodetector 22 via a plurality of secondary input waveguides 28. Advantageously, this provides a larger light capturing cross-section.

As is evident from the foregoing discussion, the present invention provides an optical coupling device or apparatus with a power monitoring function. Advantageously, the scavenging photodetection device of the present invention allows for monitoring of input power during alignment and assembly of a light source, which may be a laser diode or an optical fibre. During operation, the laser power may also be monitored and fed back to a laser driver circuit. Advantageously, the power monitoring function is achieved without the use of power splitters or power taps and utilizes light which would otherwise be wasted. Unlike directional couplers, the wavelength dependence of the scavenging photodetection device of the present invention is low and fabrication tolerance is high. Further advantageously, the scavenging photodetection device of the present invention further prevents uncollected light from causing optical crosstalk in photonic integrated circuits on a chip.

While preferred embodiments of the invention have been illustrated and described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A scavenging photodetection device, comprising:
   an optical coupling portion comprising:
      an optical coupler configured to receive light from a light source,
      a plurality of light absorbers arranged to absorb light from the light source that is not collected by the optical coupler, and
      at least one primary input waveguide optically coupled to the optical coupler and configured to direct collected light to a photonic integrated circuit; and
   a scavenging photodetection portion comprising:
      a primary photodetector configured to collect uncollected light from the optical coupling portion to determine an alignment position of the photonic integrated circuit.

2. The scavenging photodetection device of claim 1, wherein the optical coupler comprises at least one primary taper coupler.

3. The scavenging photodetection device of claim 2, wherein the optical coupler further comprises a primary light collecting waveguide optically coupled to the at least one primary taper coupler.

4. The scavenging photodetection device of claim 3, wherein the primary light collecting waveguide has a refractive index contrast of from about 0.01 to about 0.60.

5. The scavenging photodetection device of claim 3, wherein the at least one primary taper coupler comprises a first primary taper coupler and a second primary taper coupler at a predetermined spacing from one another, a power splitting ratio being defined between the first and second primary taper couplers.

6. The scavenging photodetection device of claim 1, wherein the light absorbers comprise a first light absorbing region on a first side of the at least one primary input waveguide and a second light absorbing region on a second side of the at least one primary input waveguide.

7. The scavenging photodetection device of claim 6, wherein at least one of the first and second light absorbing regions comprises a plurality of light absorbing tiles.

8. The scavenging photodetection device of claim 1, further comprising a plurality of tertiary light collecting waveguides flanking the optical coupler, wherein the tertiary light collecting waveguides are configured to collect the light from the light source that is not collected by the optical coupler and to couple the collected light into the light absorbers.

9. The scavenging photodetection device of claim 8, wherein at least one of the light absorbers comprise:
 a tertiary taper coupler optically coupled to a corresponding one of the tertiary light collecting waveguides;
 a tertiary input waveguide optically coupled to the tertiary taper coupler; and
 a secondary photodetector optically coupled to the tertiary input waveguide.

10. The scavenging photodetection device of claim 1, wherein the optical coupling portion further comprises a bend in the at least one primary input waveguide to direct the collected light away from the scavenging photodetection portion.

11. The scavenging photodetection device of claim 1, wherein the scavenging photodetection portion further comprises:
 at least one secondary taper coupler configured to collect the uncollected light from the optical coupling portion; and
 at least one secondary input waveguide optically coupled between the at least one secondary taper coupler and the primary photodetector.

12. The scavenging photodetection device of claim 11, wherein the scavenging photodetection portion further comprises a secondary light collecting waveguide optically coupled to the at least one secondary taper coupler.

* * * * *